(12) United States Patent
Harvey

(10) Patent No.: US 8,583,970 B2
(45) Date of Patent: Nov. 12, 2013

(54) ENHANCING A RECEIVER FOR IMPROVED IMPAIRMENT/FAULT DETECTION WHEN HANDLING THE RECEPTION OF INTERMITTENT SIGNALS

(76) Inventor: James Francis Harvey, Almonte (CA)

( * ) Notice: Subject to any disclaimer, the term of this patent is extended or adjusted under 35 U.S.C. 154(b) by 0 days.

(21) Appl. No.: 13/506,678

(22) Filed: May 9, 2012

(65) Prior Publication Data

US 2012/0290888 A1    Nov. 15, 2012

Related U.S. Application Data

(60) Provisional application No. 61/486,077, filed on May 13, 2011.

(51) Int. Cl.
*G01R 31/3183*   (2006.01)
*G01R 31/42*   (2006.01)

(52) U.S. Cl.
USPC ............................................ 714/712; 714/734

(58) Field of Classification Search
None
See application file for complete search history.

(56) References Cited

U.S. PATENT DOCUMENTS

| | | | |
|---|---|---|---|
| 6,603,810 B1 * | 8/2003 | Bednekoff et al. | 375/228 |
| 7,598,905 B2 | 10/2009 | Stayton | |
| 2005/0257238 A1 * | 11/2005 | Hooijmans | 725/78 |
| 2008/0274726 A1 * | 11/2008 | Simola | 455/423 |

OTHER PUBLICATIONS

Dingqing, Simulation and Verification of Pulse Doppler Radar Systems, 2010, Aerospace and Defense Symposium, Agilent Technologies, pp. 1-32.*
Example of a test transponder (PARROT) from Beel Technologies. http://www.beeltech.com/pdf/SSRM.3A.PrimePoint.v2.22-EN.pdf.

* cited by examiner

*Primary Examiner* — Ajay Bhatia
*Assistant Examiner* — Dipakkumar Gandhi
(74) *Attorney, Agent, or Firm* — Brion Raffoul

(57) ABSTRACT

One embodiment of a Test Signal generated by Test Signal Synthesis 10 being coupled, by a method of Coupling 12, to an Antenna 14, a Receiver 16 and a Method of Verification 18; for the transmission of a Test Signal to verify the operation of the Receiver Chain of equipment in Applications receiving Intermittent Signals.

4 Claims, 7 Drawing Sheets

ENHANCEMENT OF THE RECEIVER WITH A TEST SIGNAL SYNTHESIS, METHOD OF TEST SIGNAL CHANGE AND RECEIVED TEST SIGNAL ANALYSIS

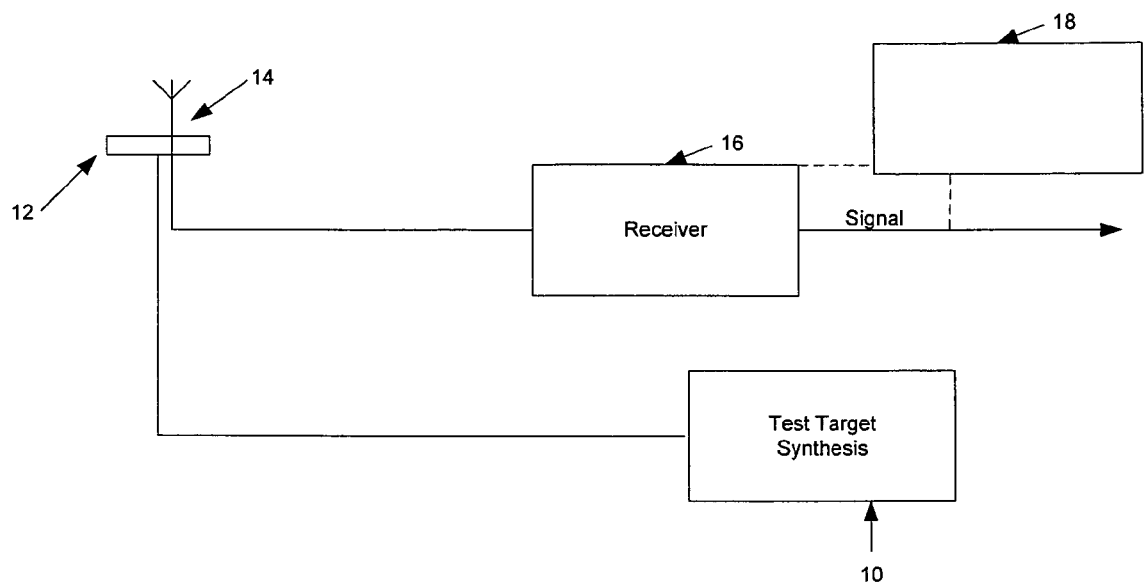
FIGURE 1 ENHANCEMENT OF THE RECEIVER WITH A TEST SIGNAL

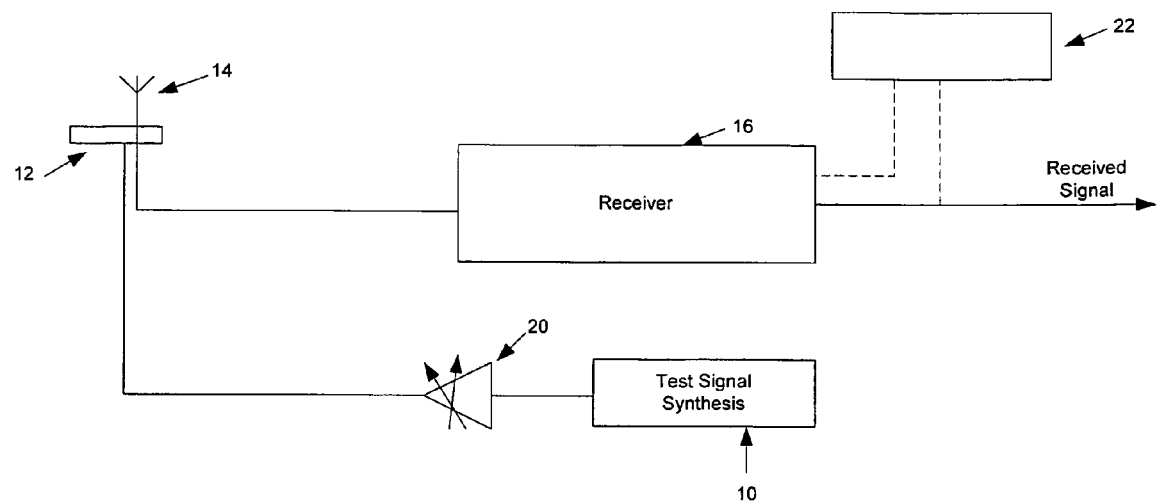
FIGURE 2 ENHANCEMENT OF THE RECEIVER WITH A TEST SIGNAL SYNTHESIS,
METHOD OF TEST SIGNAL CHANGE AND RECEIVED TEST SIGNAL ANALYSIS

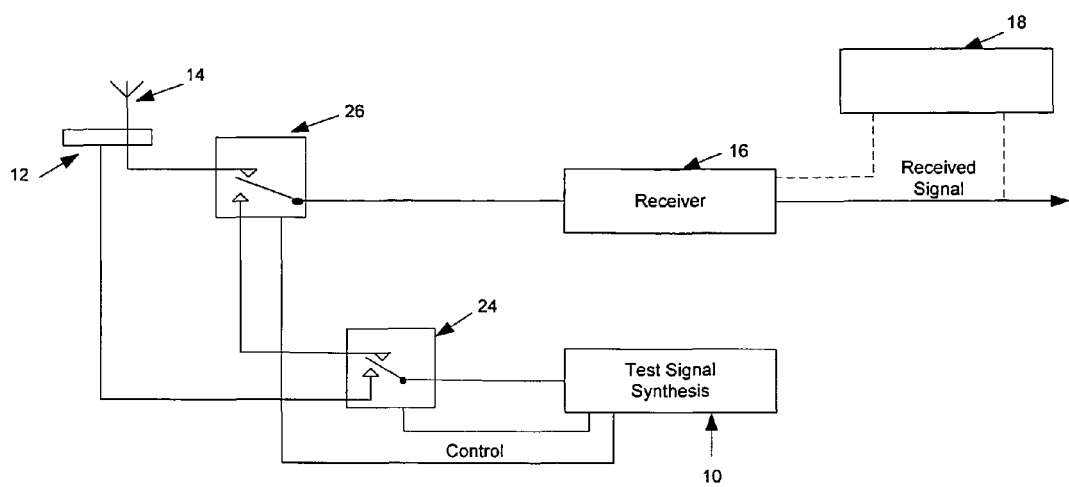
FIGURE 3 ENHANCEMENT OF THE RECEIVER WITH TEST SIGNAL SYNTHESIS, INTERNAL LOOPBACK AS WELL AS EXTERNAL LOOPBACK OF THE TEST SIGNAL, AND VERIFICATION OF THE TEST SIGNAL

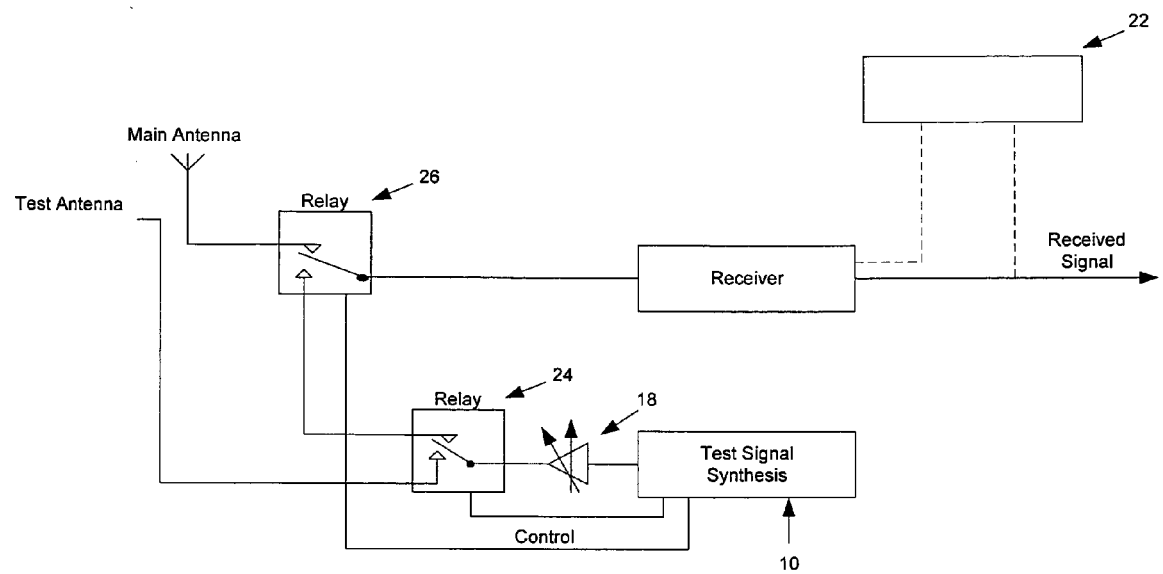
FIGURE 4 ENHANCEMENT OF THE RECEIVER WITH EXTERNAL LOOPBACK AND INTERNAL LOOPBACK OF TEST SIGNAL; METHOD OF TEST SIGNAL CHANGE AND RECEIVED TEST SIGNAL ANALYSIS

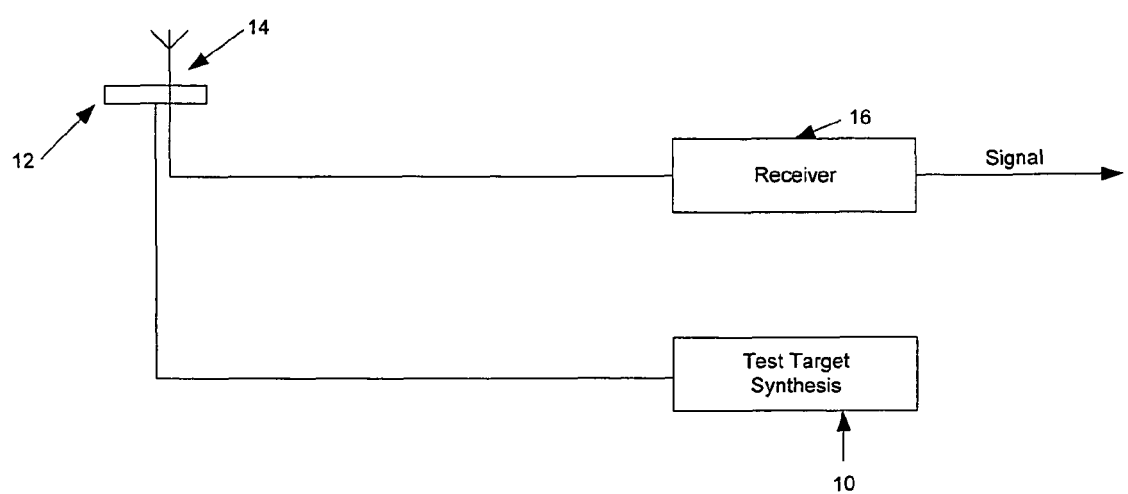
FIGURE 5 RECEIVE ONLY APPLICATION

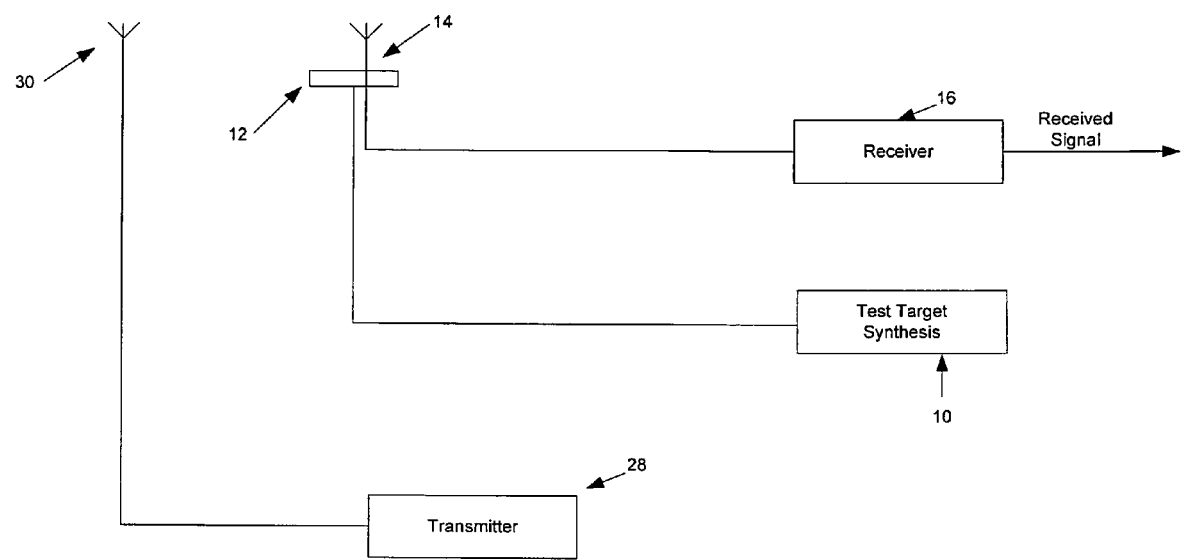
FIGURE 6 TRANSMIT AND RECEIVE APPLICATION WITH DEDICATED TRANSMIT AND RECEIVE ANTENNA

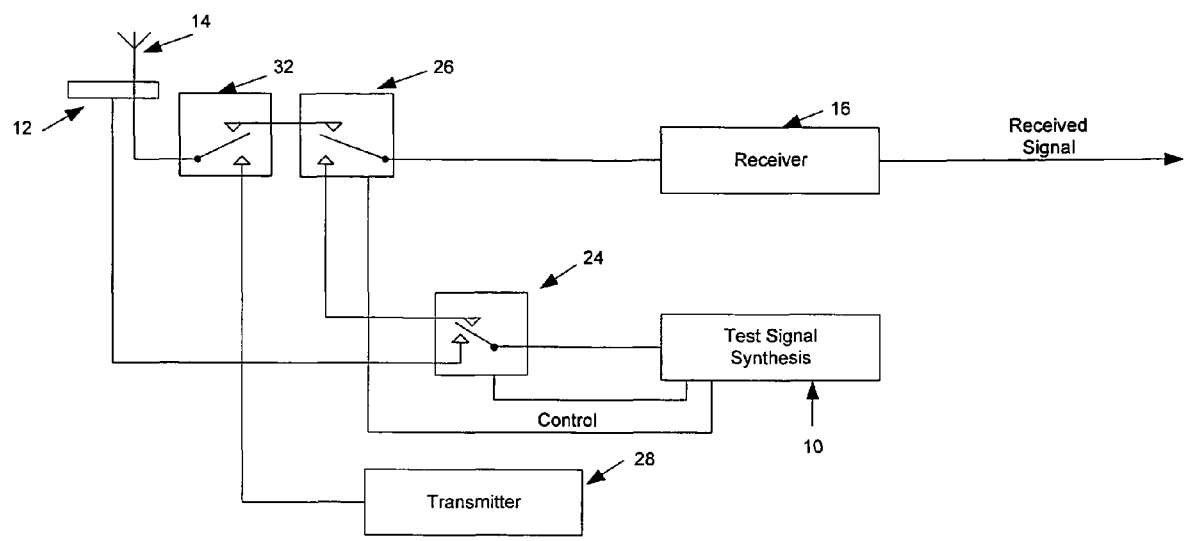
FIGURE 7 TRANSMIT AND RECEIVE APPLICATION WITH SHARED ANTENNA

ENHANCING A RECEIVER FOR IMPROVED IMPAIRMENT/FAULT DETECTION WHEN HANDLING THE RECEPTION OF INTERMITTENT SIGNALS

CROSS-REFERENCE TO RELATED APPLICATIONS

This application claims the benefit of Provisional Patent Application No. 61/486,077 files 13-MAY-2011 by the present inventor.

FEDERALLY SPONSORED RESEARCH

Not Applicable

SEQUENCE LISTING OR PROGRAM

Not Applicable

BACKGROUND

1. Field

This application relates to Receivers used in services where the received signals are intermittent.

2. Prior Art

Receivers used in services where the received signals are intermittent have a problem in detecting when the Receiver Chain of equipment (e.g. Antenna, cabling, connectors, Receiver, power, etc.) has an impairment or fault.

In RADAR applications, if a response is not detected to an interrogation signal, is it because there are no targets or is it because the Receiver Chain of equipment is impaired or faulty?

In two-way radio applications, if a response is not received from a called party, is it because the called party is not responding or is it because the Receiver chain is impaired or faulty?

Similarly, in one-way (receive-only) radio applications, if a signal is not received within a pre-specified period, is it because there is no information available or is it because the Receiver Chain of equipment is impaired or faulty?

In PRIMARY or AREA SURVEILLANCE RADAR, use is sometimes made of signals reflecting Permanent Echoes, to verify the operation of the Receiver Chain of equipment; if these Permanent Echoes are available and detectable within the RADAR coverage area. However, if the RADAR uses Moving Target Indication, Moving Target Detection or Doppler Processing filters; these (stationary) Permanent Echoes are eliminated from the received signals.

In Secondary Surveillance Radar and Automatic Dependent Surveillance-Broadcast; use is sometimes made of a Test Transponder, sometimes called a Position Adjustable Range Reference Orientation Transponder or PARROT. This Test Transponder needs to be placed at a distance from the Receiver so it requires real estate and reliable power. It usually also requires reliable communications so it can be monitored by Remote Maintenance Monitoring.

A solution to these problems is to regularly synthesize a Test Signal at a pre-determined interval, inject it into the Receiver, and have a method of verifying that the Test Signal is detected.

SUMMARY

In accordance with one embodiment, a Receiver is enhanced with a method whereby Test Signal Synthesis injects a Test Signal at a pre-determined interval into the front end of a Receiver in Applications using intermittent signals; and a means is provided to verify the detection of the Test Signal.

DRAWINGS

FIG. 1—Enhancement of the Receiver with a Test Signal

FIG. 2—Enhancement of the Receiver with Test Signal Synthesis, Method of Test Signal Change and Received Test Signal Analysis.

FIG. 3—Enhancement of the Receiver with Test Signal Synthesis, Internal Loopback as well as External Loopback of the Test Signal, and Verification of the Test Signal FIG. 4—Enhancement of the Receiver with External Loopback and Internal Loopback of Test Signal; Method of Test Signal Change and Received Test Signal Analysis FIG. 5—Receive Only Application FIG. 6—Transmit and Receive Application with Dedicated Transmit and Receive Antenna FIG. 7—Transmit and Receive Application with Shared Antenna

DRAWINGS

Reference Numerals

10 Test Signal Synthesizer
12 Method of Coupling
14 Antenna
16 Receiver
18 Method of Verification
20 Method of Test Signal Change
22 Method of Analysis
24 First Method of Routing Test Signal
26 Second Method of Routing Tests Signal
28 Transmitter
30 Transmit Antenna
32 Third Method of Routing Test Signal

DETAILED DESCRIPTION

FIG. 1 Enhancement of the Receiver with a Test Signal

First Embodiment

One embodiment is illustrated in FIG. 1. A method of generating a Test Signal using Test Signal Synthesis 10 is connected to an Antenna 14 by a Method of Signal Coupling 12. The Antenna 14 is connected to a Receiver 16. The Receiver 16 is connected to a Method of Verification 18.

Operation

The Test Signal Synthesis 10 regularly generates a Test Signal at a pre-determined interval. This Test Signal is coupled into the Antenna 14 by a Method of Signal Coupling 12. The Test Signal is then received by the Receiver 16. The Test Signal Detection by the Receiver 16 is verified by a Method of Verification 18. This could be a human means (e.g. in a radio application, the Test Signal is heard by the operator; in a RADAR application, the Test Signal is seen as a target); or an electronic means.

FIG. 2—Enhancement of the Receiver with Test Signal Synthesis, Method of Test Signal Change and Received Test Signal Analysis.

In FIG. 2, a Test Signal generated by the Test Signal Synthesis 10 is connected to a Method of Test Signal Change 20 which is connected to the Method of Signal Coupling 12 to the Antenna 14. The Antenna 14 is connected to the Receiver 16 which is connected to a Method of Analysis 22.

Operation

In FIG. 2, the Test Signal generated by the Test Signal Synthesis 10 is subjected to pre-determined ranges of changes using a Method of Signal Change 20. The received Test Signal is then analyzed by the Method of Analysis 22 for compliance with pre-determined ranges of Receiver 16 performance corresponding to the predetermined ranges of changes.

FIG. 3—Enhancement of the Receiver with Test Signal Synthesis, Internal Loopback as well as External Loopback of the Test Signal, and Verification of the Test Signal In FIG. 3, the Test Signal Synthesis 10 is connected to the First Method of Signal Routing 24.

One output from the First Method of Signal Routing 24 is connected to the Antenna 14 via the Method of Signal Coupling 12. The Antenna 14 is connected to the Second Method of Signal Routing 26 which is connected to the Receiver 16. The Receiver 16 is connected to a Method of Verification 18.

The second output from the First Method of Signal Routing 24 is connected to the Second Method of Signal Routing 26. Note: the electrical symbol for a relay is used to show a Method of Signal Routing; to simplify explanation. However, any technology that can perform Signal Routing can be used.

Operation

In FIG. 3, two methods of signal routing are employed to allow internal as well as external "loopback" of the Test Signal for test purposes.

When the First Method of Routing 24 connects the Test Signal Synthesis 10 to the Method of Signal Coupling 12 to the Antenna 14; and the Second Method of Signal Routing 26 connects the Antenna 14 to the Receiver 16 and Method of Verification 18; an "external" test loopback is performed. This will verify the Antenna 12 connection to the Receiver 16 and Method of Verification 18.

However, when the First Method of Signal Routing 24 connects the Test Signal Synthesis 10 to the Second Method of Signal Routing 26; and the Second Method of Signal Routing 26 connects the First Method of Signal Routing 24 to the Receiver 16 and Method of Verification 18; an "internal" loopback is performed.

By this means, signal impairments or faults can be isolated and identified to either "external" equipment or "internal" equipment; in the Receiver's Chain of equipment.

FIG. 4—Enhancement of the Receiver with External Loopback and Internal Loopback of Test Signal; Method of Test Signal Change and Received Test Signal Analysis In FIG. 4, the Test Signal generated by the Test Target Synthesis 10 is connected to the Method of Signal Change 20 which is connected to a First Method of Signal Routing 24.

One output from the First Method of Signal Routing 24 is connected to the Antenna 14 via the Method of Signal Coupling 12. The Antenna 14 is connected to the Second Method of Signal Routing 26 which is connected to the Receiver 16. The Receiver 16 is connected to a Method of Verification 18.

The second output from the First Method of Signal Routing 24 is connected to the Second Method of Signal Routing 26. Note: the electrical symbol for a relay is used to show a Method of Signal Routing; to simplify explanation. However, any technology that can perform Signal Routing can be used.

Operation

In FIG. 4, the Test Signal is subjected to pre-determined ranges of changes using a Method of Signal Change 20. The received Test Signal is then analyzed by the Method of Analysis 22 for Receiver 16 Chain compliance with pre-determined ranges of performance corresponding to the predetermined ranges of changes.

Any impairments or faults that affect the pre-determined performance of the Receiver 16 can be isolated to external or internal equipment in the Receiver 16 Chain of equipment.

Alternative Embodiments

These methods apply both if the Application is receive only (FIG. 5); Transmit and Receive using individual dedicated antennas for Transmit and Receive (FIG. 6); or Transmit and Receive using a shared antenna (FIG. 7).

In FIG. 5, the Antenna 14 is dedicated to the Receiver 16.

In FIG. 6, the Transmitter 28 has a dedicated Antenna 30 that is separate from the Receiver Antenna 14.

In FIG. 7, the Transmitter 28 shares an Antenna 14 with the Receiver 16 via the third Method of Signal Routing 30.

There are various possibilities with regard to the Test Signal. On its own it can provide a GO/NO GO Operation/Fault indication. With variation of the Test Signal by Means of the Method of Signal Change 20 over the pre-specified ranges of the Receiver; the performance of the Receiver 16 Chain of equipment can be determined.

In Moving Target Indication, Moving Target Detection and Doppler Processing RADAR Applications, filters can be incorporated into the Receiver 16 Chain of equipment. By means of the Method of Signal Change 20; (for example, range, azimuth, frequency change etc.); Moving Target Indication, Moving Target Detection and Doppler Processing filters can be defeated.

Advantage

From the description above, a number of advantages of some of the embodiments of my enhancements to Receivers become evident:

a) A method of early detection of impairments and faults in Receivers receiving intermittent signals.
b) A method of detecting and isolating impairments and faults to internal (internal loopback) or external (external loopback) Receiver Chain of equipment; hence speeding their correction.
c) A method that can be incorporated into new designs or retrofitted to existing designs.

CONCLUSION, RAMIFICATION AND SCOPE

Accordingly, the reader can see that the method of enhancing Receivers, using the various embodiments, can provide a speedy and effective method to detect and isolate impairments and faults; for their speedy correction; in Applications using Intermittent Signals. Some of these Applications (for example, RADAR, Automatic Dependent Surveillance-Broadcast, etc.) can be mission-critical and flight-safety related.

Although the description above contains many specifics, these should not be construed as limiting the scope of the embodiments but as merely providing illustrations of some of the presently preferred embodiments.

Thus, the scope of the embodiments should be determined by appended claims and their legal equivalents, rather than by the examples given.

The invention claimed is:
1. A method for monitoring the performance of a receiver of intermittent signals; the method comprising:
regularly synthesizing a test signal at a pre-determined interval using a method of test signal synthesis;

a means of coupling said test signal to an antenna of said receiver;

a means of verifying that said test signal is detected by the receiver;

wherein said test signal is subjected to change by a method of signal change to defeat filters for moving target indication, moving target detection, and Doppler processing.

2. The method as disclosed in claim 1 wherein said test signal is subjected to a pre-determined range of changes by a method of signal change; and an output of said receiver is analyzed for compliance with a pre-determined range of performance corresponding to said pre-determined range of changes.

3. The method as disclosed in claim 2 wherein a second means of coupling is used to couple said test signal directly into an input of said receiver.

4. The method as disclosed in claim 1 wherein a second means of coupling is used to couple said test signal directly into an input of said receiver.

\* \* \* \* \*